United States Patent

Bemis et al.

Patent Number: 5,650,178
Date of Patent: Jul. 22, 1997

[54] CO-INJECTION MANIFOLD FOR INJECTION MOLDING

[75] Inventors: Peter F. Bemis; Daniel Cykana; Loren C. Albrecht, all of Sheboygan; Gerald W. Swart, Sheboygan Falls, all of Wis.

[73] Assignee: Bemis Manufacturing Company, Sheboygan Falls, Wis.

[21] Appl. No.: 344,493

[22] Filed: Nov. 23, 1994

[51] Int. Cl.[6] .................................................. B29C 45/23
[52] U.S. Cl. .......................... 425/130; 425/562; 425/564
[58] Field of Search ................................. 425/130, 563, 425/564, 573, 562

[56] References Cited

U.S. PATENT DOCUMENTS

| | | | |
|---|---|---|---|
| 3,530,539 | 9/1970 | Gellert. | |
| 3,947,175 | 3/1976 | Melcher | 425/130 |
| 3,947,177 | 3/1976 | Eckardt | 425/130 |
| 4,268,240 | 5/1981 | Rees et al. | 425/548 |
| 4,279,582 | 7/1981 | Osuna-Diaz | 425/159 |
| 4,315,724 | 2/1982 | Taoka et al. | 425/130 |
| 4,376,625 | 3/1983 | Eckardt | 425/564 |
| 4,497,621 | 2/1985 | Kudert et al. | 425/572 |
| 4,501,550 | 2/1985 | Nikkuni | 425/549 |
| 4,542,054 | 9/1985 | Fillmann | 428/68 |
| 4,563,147 | 1/1986 | Langecker | 425/376 A |
| 4,588,367 | 5/1986 | Schad | 425/549 |
| 4,657,496 | 4/1987 | Ozeki et al. | 425/130 |
| 4,682,945 | 7/1987 | Schad | 425/549 |
| 4,712,990 | 12/1987 | Kudert et al. | 425/130 |
| 4,717,324 | 1/1988 | Schad et al. | 425/130 |
| 4,749,554 | 6/1988 | Proksa et al. | 422/133 |
| 4,752,199 | 6/1988 | Arai | 425/130 |
| 4,789,318 | 12/1988 | Ehritt | 425/130 |
| 4,808,101 | 2/1989 | Schad et al. | 425/130 |
| 4,889,477 | 12/1989 | Wortberg et al. | 425/133.1 |
| 4,931,234 | 6/1990 | Schad et al. | 264/40.1 |
| 4,944,909 | 7/1990 | Eckardt et al. | 264/258 |
| 5,028,226 | 7/1991 | De'ath et al. | 425/130 |
| 5,069,612 | 12/1991 | Teutsch et al. | 425/133.1 |
| 5,076,776 | 12/1991 | Yamada et al. | 425/133.1 |
| 5,078,589 | 1/1992 | Osuna-Diaz | 425/562 |
| 5,078,942 | 1/1992 | Sullivan et al. | 264/173 |
| 5,093,053 | 3/1992 | Eckardt et al. | 264/45.1 |
| 5,093,054 | 3/1992 | Hirota | 264/45.1 |
| 5,094,603 | 3/1992 | Gellert | 425/130 |
| 5,106,284 | 4/1992 | Kobayashi et al. | 425/130 |
| 5,125,817 | 6/1992 | Yamachika | 425/130 |
| 5,143,733 | 9/1992 | Von Buren et al. | 425/130 |
| 5,169,648 | 12/1992 | Eckardt et al. | 425/130 |
| 5,206,032 | 4/1993 | Bock | 425/131.1 |
| 5,223,275 | 6/1993 | Gellert | 425/130 |
| 5,256,051 | 10/1993 | Langos et al. | 425/133.1 |
| 5,316,583 | 5/1994 | Milliman | 118/405 |
| 5,368,470 | 11/1994 | Manner | 425/564 |
| 5,385,461 | 1/1995 | Machida | 425/130 |
| 5,460,771 | 10/1995 | Mitchell et al. | 264/508 |
| 5,556,582 | 9/1996 | Kazmer | 264/40.1 |
| 5,562,931 | 10/1996 | Takeuchi | 425/207 |

*Primary Examiner*—Tim Heitbrink
*Attorney, Agent, or Firm*—Michael, Best & Friedrich

[57] ABSTRACT

Injection molding apparatus comprising a platen, a die which is fixed to the platen and which defines a mold cavity having an inlet, a co-injection manifold mounted on the platen, the manifold including a nozzle housing having forward and rearward ends, the nozzle housing including an outlet which is located adjacent the forward end and which communicates with the mold cavity inlet, first and second spaced apart inlets which are located adjacent the rearward end and which are respectively adapted to communicate with first and second injection nozzles, a first passageway communicating between the first inlet and the outlet, and a second passageway communicating between the second inlet and the outlet.

11 Claims, 5 Drawing Sheets

CO-INJECTION MANIFOLD FOR INJECTION MOLDING

BACKGROUND OF THE INVENTION

The invention relates to injection molding apparatus, and more particularly to co-injection apparatus, i.e., apparatus for injecting two different materials, typically an inner core material and an outer skin material, into a single multi-mold cavity.

A co-injection manifold receives material, usually plastic, from two different injection units and combines the two materials into a single stream that flows into a mold or die. The co-injection manifold is thus located between the injection units and the mold. A typical co-injection manifold is fixed to the injection units.

U.S. Pat. No. 4,376,625 discloses a co-injection manifold mounted on an injection unit. Another injection unit communicates with the co-injection manifold via a tube. The manifold has a forwardly opening outlet, an annular port axially behind or upstream of the outlet, and a central port axially behind or upstream of the annular port. One injection unit communicates with the central port, and the other injection unit communicates with the annular port. A valve member is movable between a fully forward position blocking both of the ports, an intermediate position blocking only the central port, and a rearward position clear of both ports. In the fully forward position, no material flows through the outlet. In the intermediate position, only material from the annular port flows through the outlet. In the rearward position, both material from the annular port and material from the central port flow through the outlet.

SUMMARY OF THE INVENTION

The invention provides an improved co-injection manifold and an improved arrangement for supporting a co-injection manifold.

The co-injection manifold comprises a nozzle housing including an outlet in the forward end of the housing. First and second spaced apart inlets are located in the rearward end of the housing and are respectively adapted to communicate with first and second injection nozzles. The first nozzle provides the inner core material and the second nozzle provides the outer skin material. The housing has therein a generally cylindrical bore centered on an axis extending from forward to rearward. The forward downstream end of the bore communicates with the housing outlet, a first passageway communicates between the first inlet (the core inlet) and the rearward upstream end of the bore, and a second passageway communicates between the second inlet (the skin inlet) and the bore via an opening intermediate the upstream and downstream ends of the bore.

A nozzle member is housed in the bore, the nozzle member having a forward end which is spaced rearwardly from the nozzle housing outlet and which has therein an outlet port. The nozzle member has therein a central bore extending along the axis and communicating between the first passageway (the core passageway) and the nozzle member outlet port. The nozzle member and the nozzle housing define therebetween an annular passageway surrounding the central bore and the outlet port and communicating between the second passageway (the skin passageway) and the outlet. The outer surface of the nozzle member is shaped to provide evenly distributed flow of skin material through the annular passageway and around the core material. By providing a controlled and uniform thickness of the skin material, the percentage of the core material can be maximized without the typical shadowing or bursting-through of the core material to the part surface. The nozzle member can be easily removed and replaced with a nozzle member specifically designed for certain materials. A variety of material melt viscosities can therefore be used with the manifold.

A valve pin extends through the central bore of the nozzle member. The pin is movable between a forward position wherein the pin extends into and closes both the nozzle member outlet port and the nozzle housing outlet (so neither material flows through the outlet), an intermediate position wherein the valve pin is spaced from the nozzle housing outlet and extends into and closes the nozzle member outlet port (so only skin material flows through the outlet), and a rearward position wherein the valve pin is spaced from both the nozzle housing outlet and the nozzle member outlet port (so both skin material and core material flow through the outlet).

The design of the manifold provides a clean entry and exit of the core material into the melt stream of the outer skin material. In other words, the starting and stopping of the flow of core material is abrupt, thereby not cross-contaminating the outer skin material. The advantage is that gates show very little, if any, evidence of the core material. Also, because flow of core material into the mold is stopped before the mold is filled, only outer skin material is left in the manifold nozzle after the mold is filled. Because the core material is stopped cleanly there is no core material in the leading edge of material left in the manifold, which material forms the leading edge of material for the next part to be made. Because no core material is visible on the part surface, the core material can be significantly different from the outer skin material. This is a significant advantage over known systems which are not designed to completely encapsulate the core material.

The co-injection manifold of U.S. Pat. No. 4,376,625 provides some of these features but has a significant disadvantage when compared to the co-injection manifold of the invention. The manifold of U.S. Pat. No. 4,376,625 has a central bore for the core material, and the outer skin material flows through an annular passageway surrounding the central bore. The outer skin material flows to the annular passageway through four separate passageways 12. This requires four separate melt flows to merge into a single flow in the annular passageway. The result is material knitlines visible on the part surface. This can be an aesthetic problem and can cause a weak area in the skin. The manifold of the invention does not have these problems because the outer skin material flows to the annular passageway through a single passageway.

The manifold is mounted to the machine sled in a manner that allows the user to purge the injection units or nozzles without having the material go through the manifold. This is advantageous in instances where the material has become contaminated or when abrasive purge compounds are needed.

Another advantage of the mounting of the manifold is that the injection units can easily be retracted from the manifold without disassembly. Known manifolds are mounted directly to the injection units so that any changes to screen packs, nozzle configurations, shut-offs or screws requires removal of the manifold. The manifold of the invention allows one or both screws to be backed off without disassembly.

The manifold is mounted so that it can easily be rotated 180°. This is a significant advantage when two different size barrels are used, as is common.

3

Other features and advantages of the invention will become apparent to those skilled in the art in view of the following detailed description, claims and drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An injection molding apparatus 10 embodying the invention is illustrated in FIGS. 1 through 10. The apparatus 10 comprises a platen 14. A mold or die 22 (see FIG. 1) is fixed to the platen 14. Any suitable means can be used to secure the die 22 to the platen 14. The die 22 defines a mold cavity having an inlet 26.

The apparatus 10 also comprises (see FIG. 1) a co-injection manifold 30 mounted relative to the platen 14. The manner in which the manifold 30 is mounted is described below. The co-injection manifold 30 comprises a nozzle housing 34 having forward and rearward ends. While the illustrated housing 34 includes four portions 38, 42, 46 and 50 fixed together, it should be understood that the housing 34 can be made of any number of portions or a single portion. The nozzle housing 34 is generally V-shaped and includes angularly spaced first and second or right and left arms 54 and 58. Each arm has a rearward end 62 and includes an outwardly extending mounting portion 66. The nozzle housing 34 has an outlet 70 in its forward end, a first inlet 74 in the rearward end of the first arm 54, and a second inlet 78 in the rearward end of the second arm 58. The outlet 70 is located on a horizontal axis extending from the forward to rearward. The outlet 70 communicates with a nozzle 82 that communicates with the mold cavity inlet 26. The inlets 74 and 78 communicate with injection nozzles 84 and 88 of respective injection units (not shown). In the illustrated construction, the injection nozzle 84 injects the inner core material and the nozzle 88 injects the outer skin material.

4

The nozzle housing 34 includes (see FIG. 4) a generally cylindrical inner surface 92 defining a bore 96 that is centered on an axis 98 and that communicates with the outlet 70. The bore 96 has a rearward upstream end (the upper end in FIG. 4) and a forward downstream end (the lower end in FIG. 4). The majority of the bore 96 has a cross-sectional area substantially greater than the cross-sectional area of the outlet 70, and the forward end of the bore 96 is frustoconical such that the bore 96 tapers down to the outlet 70. The nozzle housing 34 also defines (see FIGS. 1 and 4) a first passageway 104 communicating between the first inlet 74 and the upstream end of the cylindrical bore 96. The housing 34 also defines a second passageway 108 communicating between the second inlet 78 and the bore 96. The second passageway 108 communicates with the bore 96 through a second passageway opening 112 (see FIG. 4) located intermediate the opposite ends of the bore 96. The first passageway 104 extends in large part through the first arm 54 of the housing 34, and the second passageway 108 extends in large part through the second arm 58 of the housing 34. Both passageways intersect the bore 96 at an angle of approximately thirty-five degrees. This facilitates material flow from the passageways 104 and 108 into the bore 96.

The manifold 30 also comprises (see FIGS. 1 and 4-10) a nozzle member 116 housed in the bore 96. The rearward end of the nozzle member 116 has thereon (see FIG. 4) an annular flange 120 captured between the housing portions 42 and 46 to secure the member 116 in the bore 96. The forward end of the nozzle member 116 is spaced rearwardly from the nozzle housing outlet 70 and has therein (see FIGS. 4 and 5) an outlet port 124 centered on the axis 98. In the illustrated construction, the port 124 has a diameter of 0.250 inch. The nozzle member 116 has therein a central bore 128 extending along the axis 98. In the illustrated construction, the bore 128 has an inside diameter of 0.559 inch. The forward end of the central bore 128 is tapered at an angle of forty degrees and communicates with the nozzle member outlet port 124. The rearward end of the central bore 128 communicates with the downstream end of the first passageway 104.

Figure 4:
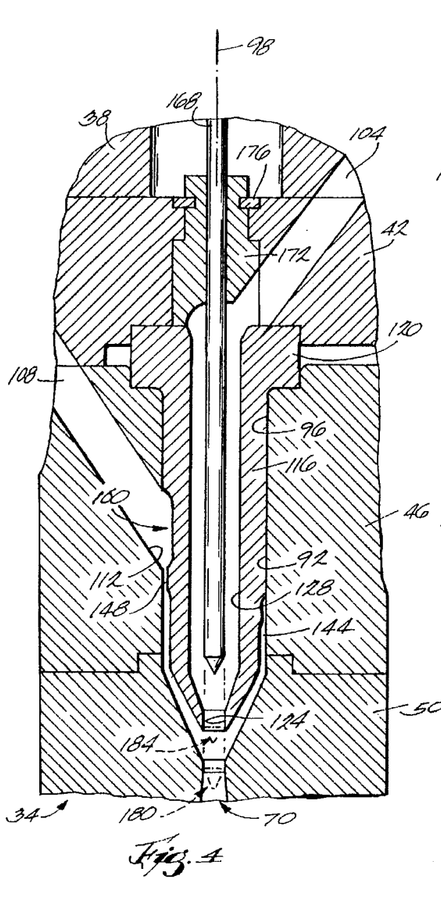
FIG. 4 is an exploded portion of FIG. 1.
Figure 5:
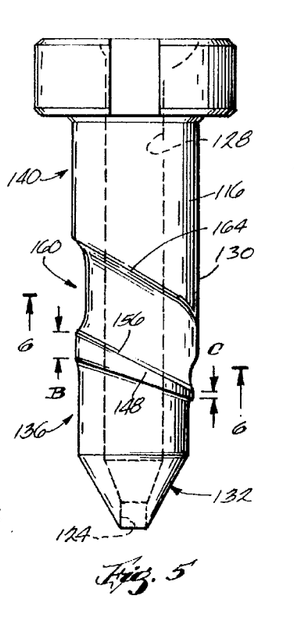
FIG. 5 is an enlarged top plan view of the nozzle member.
Figure 6:
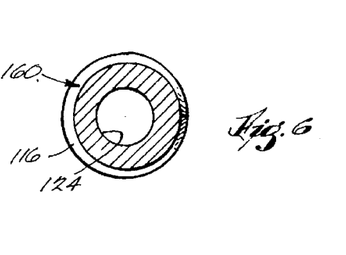
FIG. 6 is a view taken along lines 6—6 in FIG. 5.
Figure 7:
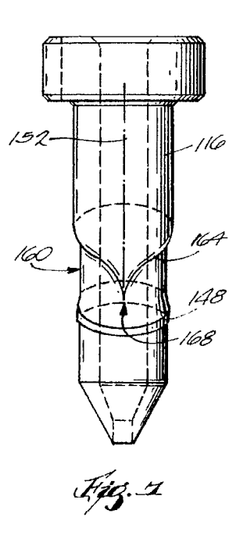
FIG. 7 is a reduced view of the right side of the nozzle member as seen in FIG. 5.
Figure 8:
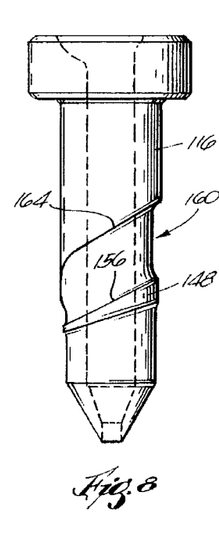
FIG. 8 is a view similar to FIG. 7 showing the bottom of the nozzle member as seen in FIG. 5.
Figure 9:
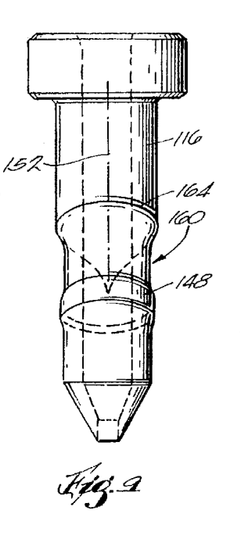
FIG. 9 is a view similar to FIG. 7 showing the left side of the nozzle member as seen in FIG. 5.
Figure 10:
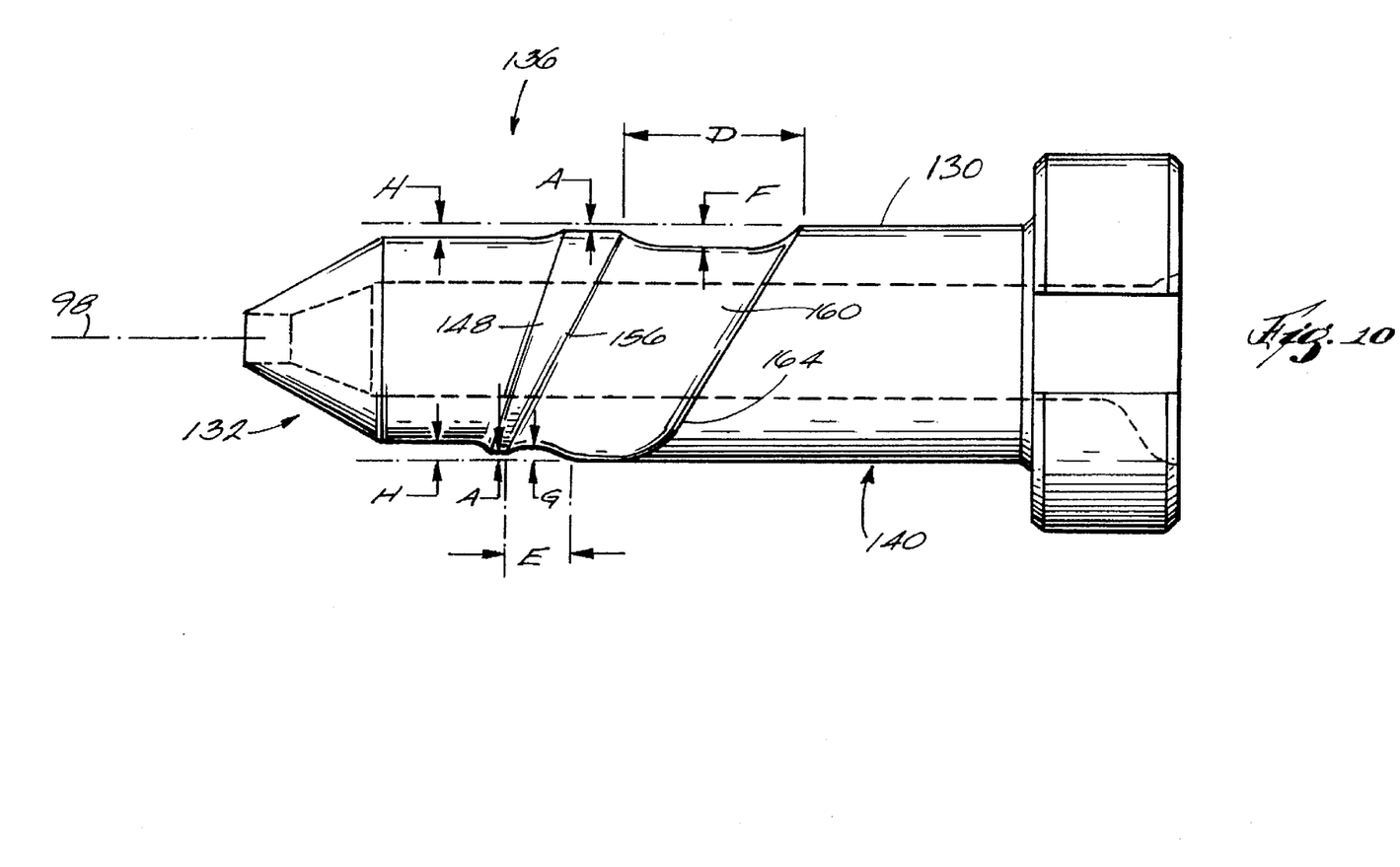
FIG. 10 is the same as FIG. 5 but enlarged.

The nozzle member 116 has (see FIGS. 5 and 10) an outer surface 130 divided into three sections: the forward section 132; the middle section 136; and the rearward section 140. The forward section 132 is located in the frustoconical portion of the housing bore 96 (see FIG. 4) and is tapered at an angle of sixty degrees. The rearward section 140 extends rearwardly from the second passageway opening 112 in the bore 96. The middle section 136 extends between the forward and rearward sections. The rearward section 140 of the outer surface 130 is generally cylindrical and has a diameter substantially equal to the diameter of the nozzle housing inner surface 92 such that there is a tight fit between the nozzle housing 34 and the rearward section 140. In the illustrated construction, the diameter of the rearward section 140 is 1.199 inch. As shown in FIG. 4, the middle and forward sections are spaced from the inner surface 92 of the nozzle housing 34 so as to define an annular passageway 144 which communicates between the second passageway 108 and the nozzle housing outlet 70 and which has a downstream end surrounding the outlet port 124.

The middle section 136 of the nozzle member outer surface 130 includes (see FIGS. 5 and 7–10) a land 148 having an outer surface forming a portion of a cylinder centered on the axis 98, i.e., the land 148 is spaced the same distance from the nozzle housing inner surface 92 around the entire circumferential extent of the land 148. In the illustrated construction, the land 148 has an outer diameter of 1.119 inch, and the outer surface of the land 148 is spaced (see reference letter "A" in FIG. 10) 0.040 inch from the nozzle housing inner surface 92. The land 148 is located immediately downstream of or forward of the second passageway opening 112. The land 148 is symmetrical about a plane (indicated by reference numeral 152 in FIGS. 7 and 9 and the plane of the paper in FIG. 4) which includes the axis 98 and which extends through the second passageway opening 112. The land 148 has an axial length (in the forward-rearward direction) that decreases in a direction circumferentially away from the second passageway opening 112. In other words, the longest part of the land 148 is on the side of the nozzle member 116 adjacent the second passageway opening 112, and the shortest part of the land 148 is on the side of the nozzle member 116 opposite the second passageway opening 112. Specifically, in the illustrated construction, the land 148 has an axial length B (see FIG. 5) of 0.280 inch adjacent the second passageway opening 112 and has an axial length C (see FIG. 5) of 0.063 inch opposite the second passageway opening 112. The upstream edge 156 of the land 148 extends forwardly or toward the outlet 70 (downwardly in FIG. 5) in the direction circumferentially away from the second passageway opening 112.

The middle section 136 of the nozzle member outer surface 130 has therein (see FIGS. 4, 5 and 7–10), rearwardly of the land 148 and in axial alignment with the second passageway opening 112, a groove 160 symmetrical about the plane 152. Like the land 148, the groove 160 has an axial length that decreases in a direction circumferentially away from the second passageway opening 112. In the illustrated construction, the groove 160 has an axial length D (see FIG. 10) of 0.907 inch adjacent the second passageway opening 112 and has an axial length E (see FIG. 10) of 0.287 inch opposite the second passageway opening 112. Unlike the land 148, the groove 160 is not spaced the same distance from the nozzle housing inner surface 92 around the entire circumferential extent of the groove 160. Instead, the groove 160 has a depth that decreases in a direction circumferentially away from the second passageway opening 112. That is, the depth of the groove 160 is greatest on the side of the nozzle member 116 adjacent the second passageway opening 112 and is least on the side of the nozzle member 116 opposite the second passageway opening 112. In the illustrated construction, the groove 160 has a depth F (see FIG. 10) of 0.120 inch adjacent the second passageway opening 112 and has a depth G (see FIG. 10) of 0.060 inch opposite the second passageway opening 112. Also, as shown in FIGS. 5 and 7–10, the upstream edge 164 of the groove 160 extends forwardly or toward the outlet 70 in a direction circumferentially away from the second passageway opening 112, and the portions of the upstream edge 164 on the opposite sides of the nozzle member 116 converge forwardly to a point 168 (see FIG. 7). Consequently, material flowing around the opposite sides of the nozzle member 116 in the groove 160 is directed forwardly toward the land 148 on the side of the nozzle member 116 opposite the second passageway opening 112. Forward or downstream of the land 148, the middle section 136 is cylindrical and is, in the illustrated construction, spaced 0.065 inch from the nozzle housing inner surface 92. This spacing is indicated by reference letter "H" in FIG. 10.

This construction of the groove 160 and the land 148 creates a relatively even flow of material over the land 148 around the entire circumferential extent thereof. The land 148 is longest and the groove 160 is deepest adjacent the second passageway opening 112 because the material flowing from the second passageway 108 is under the greatest pressure at this point. The groove 160 is most shallow and the land 148 is shortest on the side of the nozzle member 116 opposite the second passageway opening 112 because material flowing around the nozzle member 116 is under the least pressure on the opposite side of the nozzle member 116. After flowing over the land 148, the material continues to flow through the annular passageway 144 defined between the nozzle member 116 and the nozzle housing inner surface 92 until the material reaches the nozzle housing outlet 70.

It should be noted that the nozzle housing 34 and the nozzle member 116 can be viewed as a single housing defining the outlet 70, the central bore 128, and the annular passageway 144. The nozzle housing inner surface 92 and the land 148 define, in the annular passageway 144, an annular orifice with an axial length that decreases in a direction circumferentially away from the second passageway opening 112. The upstream edge of the annular orifice (the upstream edge 156 of the land 148) extends toward the outlet 70 (downwardly in FIGS. 4 and 5) in the direction circumferentially away from the second passageway opening 112.

The manifold 30 also comprises (see FIGS. 1 and 4) a valve pin 168 extending through the nozzle member central bore 128. The pin 168 is supported relative to the housing 34 by (see FIG. 1 a pin bushing 172 secured relative to the housing 34 by a clamp 176. The valve pin 168 is movable (see FIG. 4) between a forward position (indicated by reference numeral 180 in FIG. 4), an intermediate position (indicated by reference numeral 184 in FIG. 4), and a rearward position (shown in solid lines in FIG. 4). In the forward position, the valve pin 168 extends into and closes both the nozzle member outlet port 124 and the nozzle housing outlet 70, so that neither the outer skin material nor the inner core material flows through the nozzle housing outlet 70. In the intermediate position, the valve pin 168 is spaced from the nozzle housing outlet 70 but extends into and closes the nozzle member outlet port 124, so that only the outer skin material (which flows between the nozzle housing 34 and the outer surface 130 of the nozzle member 116) flows through the nozzle housing outlet 70. In the rearward position, the valve pin 168 is spaced rearwardly from both the nozzle housing outlet 70 and the nozzle member outlet port 124, so that the core material flows through the nozzle member outlet port 124 and through the nozzle housing outlet 70, and the outer skin material flows around the nozzle member 116 and surrounds the core material as both materials flow through the nozzle housing outlet 70. The valve pin 168 is moved relative to the housing 34 by a conventional hydraulic cylinder 188 (see FIG. 1) mounted on the manifold 30.

Figure 2:
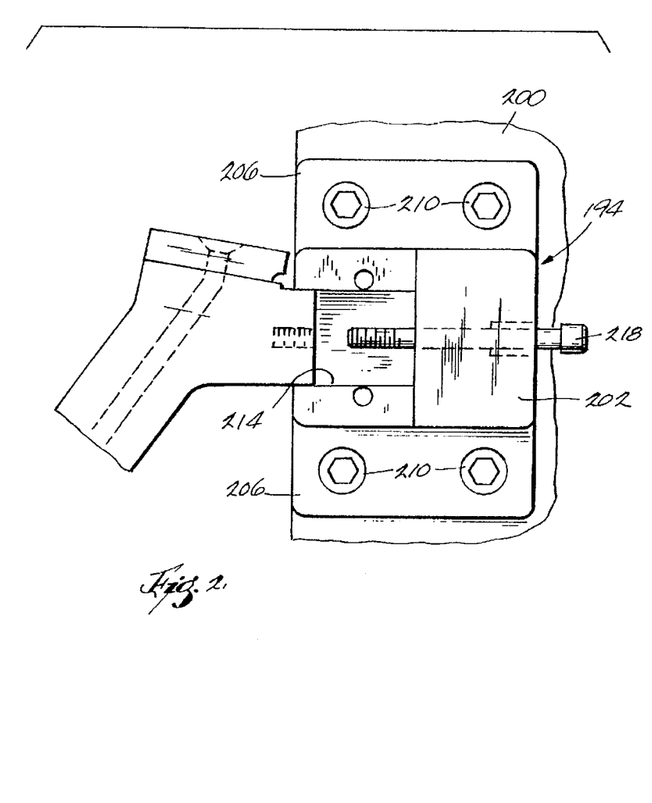
FIG. 2 is an enlarged portion of FIG. 1 with the cover plate removed from the mounting column.
Figure 3:
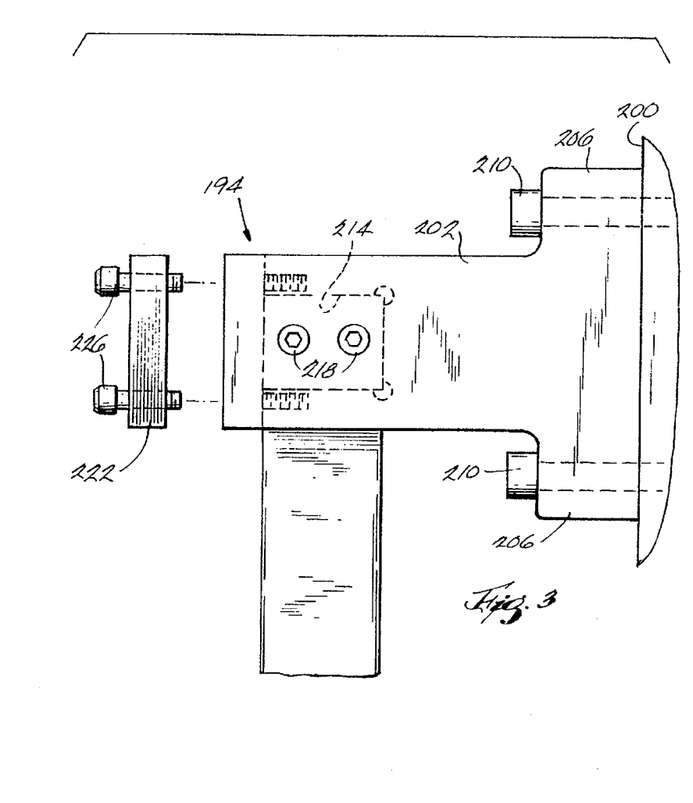
FIG. 3 is an exploded view of the right side of the mounting column shown in FIG. 2.

The manner in which the manifold 30 is mounted will now be described. As shown in FIGS. 2 and 3, the mounting portion 66 of the first arm 54 extends into and is supported by a first mounting column 194, and the mounting portion 66 of the second arm 58 extends into and is supported by a second mounting column 198. The mounting columns are fixedly mounted on the horizontal surface 200 of a machine base sled fixed relative to the platen 14. The mounting columns are mirror images of each other, and only the first mounting column 194 will be described in detail.

The mounting column 194 includes a central portion 202 having thereon forward and rearward base flanges 206. Each flange 206 has therethrough two screws or bolts 210 securing the mounting column 194 to the surface 200. The central portion 202 of the mounting column 194 defines an inwardly opening, generally rectangular seat 214 which houses the nozzle housing mounting portion 66. A pair of bolts or screws 218 extend horizontally through the mounting column central portion 202 and are threaded into the nozzle housing mounting portion 66. A cover plate 222 extends over the nozzle housing mounting portion 66 to further secure the mounting portion 66 relative to the mounting column 194. The cover plate 222 is fixed to the central portion 202 by a pair of vertically extending bolts or screws 226.

In order to move the nozzle housing 34 relative to the mounting column 194, the cover plate 222 must be removed and the bolts 218 must be unthreaded from the mounting portion 66. When both arms 54 and 58 of the nozzle housing 34 are disconnected from their respective mounting columns 194 and 198, the nozzle housing 34 can be rotated 180° about the axis 98, the first arm 54 can be secured to the second mounting column 198, and the second arm 58 can be secured to the first mounting column 194. The first inlet 74 then communicates with the second injection nozzle 88 and the second inlet 78 communicates with the first injection nozzle 84.

Figure 1:
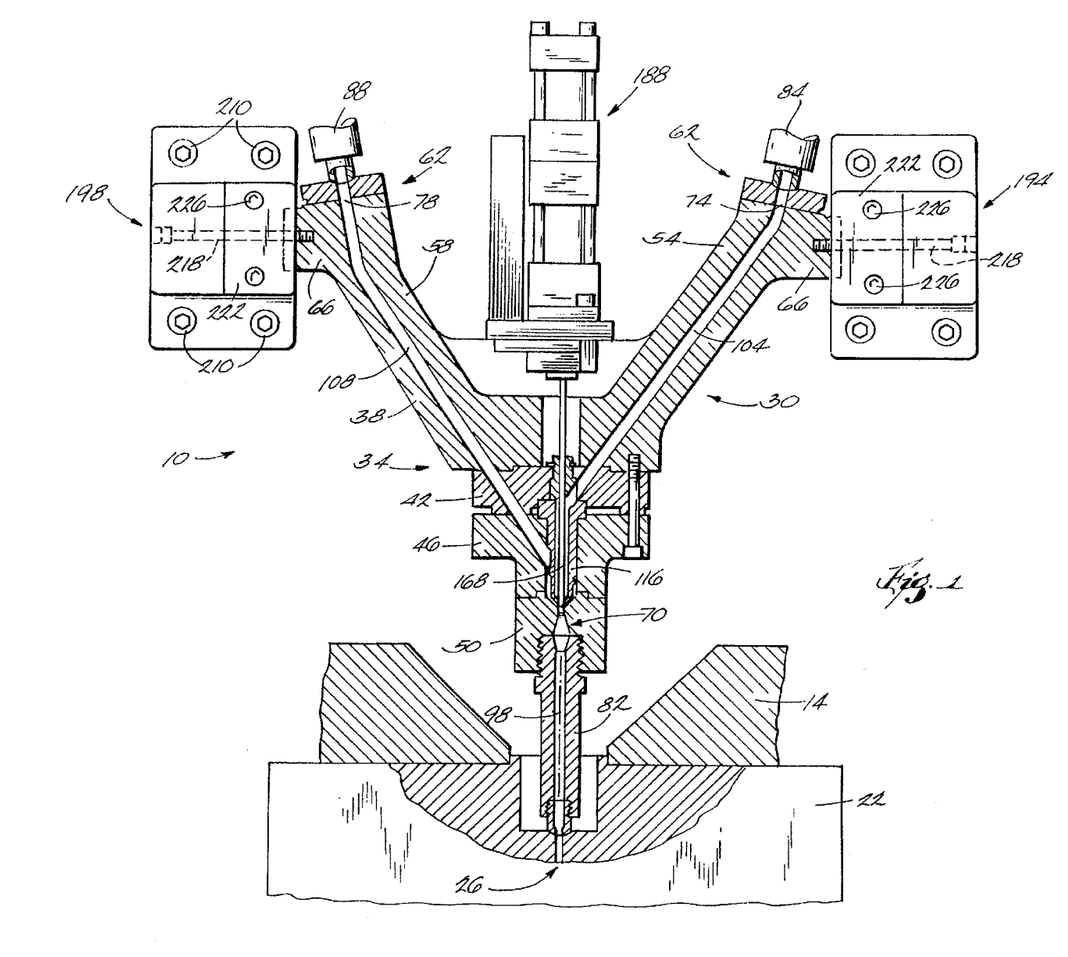
FIG. 1 is a top plan view, partially in section, of an injection molding apparatus embodying the invention.

The molding apparatus 10 operates as follows. The nozzle housing 34 is oriented as shown in FIG. 1, so that the injection nozzle 84 provides the inner core material and the injection nozzle 88 provides the outer skin material. The injection process begins with the valve pin 168 in the intermediate position, so that only the outer skin material goes through the nozzle 82. The outer skin material is injected into the die to form a skin in the mold cavity. The valve pin 168 is then moved to the rearward position, so that both the outer skin material and the inner core material flow through the nozzle 82, with the inner core material inside the outer skin material. After the die is nearly filled, the valve pin 168 is moved back to the intermediate position. This terminates flow of the inner core material and allows the outer skin material to cover the inner core material left in the gate area of the die. Once the die is "packed," the valve pin 168 is moved to the forward position to shut off the flow of both materials and to "freeze off" the gate.

Figure 11:
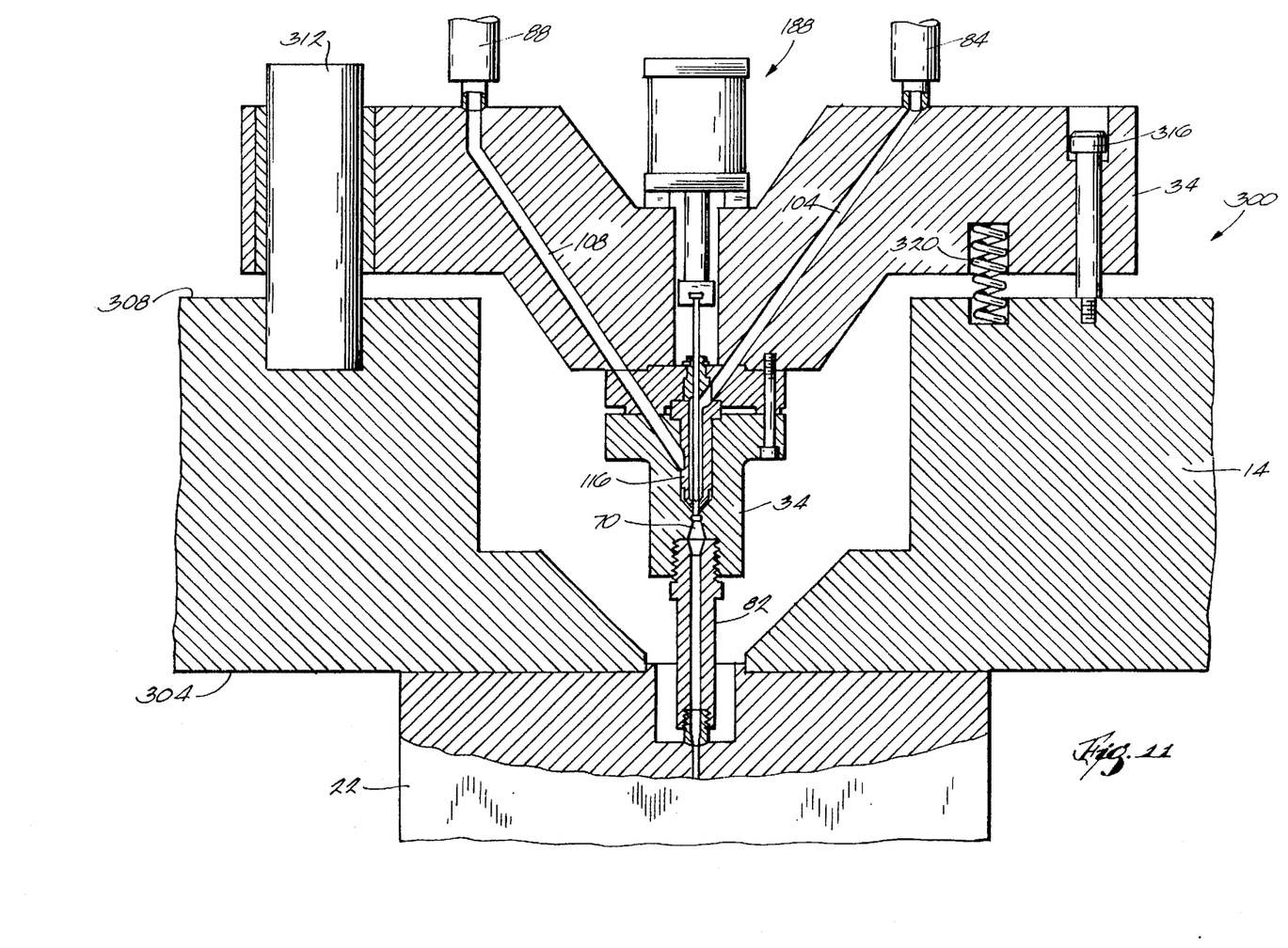
FIG. 11 is a top plan view, partially in section, of an injection molding apparatus that is an alternative embodiment of the invention.

An injection molding apparatus 300 that is an alternative embodiment of the invention is illustrated in FIG. 11. Elements that are identical to elements of the apparatus 10 have been given the same reference numerals.

In the apparatus 300, the platen 14 has opposed generally vertical surfaces 304 and 308, and the die 22 is mounted on the surface 304. The nozzle housing 34 is mounted on the opposed surface 308 of the platen 14 and is biased away from the mold cavity inlet 26 such that the nozzle housing 34 is movable toward the mold cavity inlet 26 and against the biasing force to move the nozzle housing outlet 70 into communication with the mold cavity inlet 26. A plurality of guide posts 312 (only one is shown in FIG. 11) extend horizontally from the platen surface 308, and the nozzle housing 34 is slidably supported by the posts 312 for horizontal movement relative to the platen 14. A plurality of shoulder bolts 316 (only one is shown in FIG. 11) limit movement of the nozzle housing 34 in the direction away from the platen surface 308. A plurality of springs 320 (only one is shown in FIG. 11) extend between the platen 14 and the nozzle housing 34 and bias the nozzle housing 34 away from the platen surface 308. When the injection units are moved into engagement with the nozzle housing 34, further movement of the injection units toward the die 22 moves the nozzle housing 34 against the force of the springs 320 until the manifold nozzle 82 registers with the mold cavity inlet 26.

In another embodiment of the invention (not shown), the manifold is substantially identical to the manifold 30 of the apparatus 10. The manifold is mounted on the vertical surface 308 of the platen 14 by mounting columns that are substantially identical to the mounting columns 194 and 198 of the apparatus 10 but that are pivoted 90° so that the bolts 210 are threaded into the surface 308. Various features of the invention are set forth in the following claims.

We claim:

1. Injection molding apparatus comprising a die defining a mold cavity having an inlet, and a co-injection manifold having an axis and including a nozzle housing having forward and rearward ends, said nozzle housing including an outlet which is located adjacent said forward end and which communicates with said mold cavity inlet, first and second spaced apart inlets which are located adjacent said rearward end and which are respectively adapted to communicate with first and second injection nozzles, a first passageway communicating between said first inlet and said outlet, and a second passageway communicating between said second inlet and said outlet, and said nozzle housing being mounted relative to said die such that said manifold can be rotated 180 degrees about said axis so that said first and second inlets are respectively adapted to communicate with the second and first injection nozzles.

2. Injection molding apparatus comprising a platen, a die which is fixed to said platen and which defines a mold cavity having an inlet, a co-injection manifold mounted on said platen, said manifold including a nozzle housing having forward and rearward ends, said nozzle housing including a bore which is located adjacent said forward end, which communicates with said mold cavity inlet, and which extends along an axis, first and second spaced apart inlets which are located adjacent said rearward end and which are respectively adapted to communicate with first and second injection nozzles, a first passageway communicating between said first inlet and said bore, and a second passageway communicating between said second inlet and said bore, said first and second passageways each extending relative to said axis at an angle less than 90 degrees, wherein said platen has a generally horizontal surface, wherein said manifold is mounted on said horizontal surface, and wherein said nozzle housing is mounted on said horizontal surface such that said manifold can be rotated 180 degrees about said axis so that said first and second inlets are respectively adapted to communicate with the second and first injection nozzles.

3. Apparatus as set forth in claim 2 wherein said platen has first and second opposed generally vertical surfaces, wherein said die is mounted on said first vertical surface, and wherein said manifold is mounted on said second vertical surface.

4. Apparatus as set forth in claim 3 wherein said nozzle housing is biased away from said second vertical surface by a biasing force such that said nozzle housing is movable toward said mold cavity inlet and against said biasing force to move said nozzle housing outlet into communication with said mold cavity inlet.

5. Injection molding apparatus comprising a platen, a die fixed to said platen and defining a mold cavity having an inlet, a co-injection manifold movably mounted on said platen, whereby said manifold is movable relative to said platen, said manifold including a nozzle housing having forward and rearward ends, said nozzle housing including an outlet which is located adjacent said forward end and which can be moved into fluid communicating engagement with said mold cavity inlet, first and second spaced apart inlets which are located adjacent said rearward end and which are respectively adapted to be engaged by and communicate with first and second injection nozzles, a first passageway communicating between said first inlet and said outlet, and a second passageway communicating between said second inlet and said outlet, such that a first liquid from said first passageway can flow through said nozzle housing outlet and a second liquid from said second passageway can surround the first liquid so that the first liquid forms an inner core and the second liquid forms an outer skin as both liquids flow through said nozzle housing outlet, and said nozzle housing being biased away from said mold cavity inlet and toward the first and second injection nozzles by a biasing force such that said nozzle housing is movable toward said mold cavity inlet and against said biasing force in response to engagement of the first and second injection nozzles to move said nozzle housing outlet into communication with said mold cavity inlet.

6. A co-injection manifold comprising a housing having forward and rearward ends, said housing including an outlet located adjacent said forward end, an outlet port spaced rearwardly from said outlet, a central bore having a forward end communicating with said outlet port, first and second spaced apart inlets which are located adjacent said rearward end and which are respectively adapted to communicate with first and second injection nozzles, a first passageway having one end communicating with said first inlet and having an opposite end communicating with said central bore, a second passageway having one end communicating with said second inlet and having an opposite end, and an annular passageway which surrounds said central bore, which communicates between said second passageway opposite end and said outlet, and which includes an annular orifice with an axial length that decreases in a direction circumferentially away from said second passageway opposite end, and a valve pin extending through said central bore and being movable between a forward position wherein said valve pin extends into and closes both said outlet port and said outlet, an intermediate position wherein said valve pin is spaced from said outlet and extends into and closes said outlet port, and a rearward position wherein said valve pin is spaced from both said outlet and said outlet port.

7. A manifold as set forth in claim 6 wherein said annular passageway is centered on an axis and is symmetrical about a plane including said axis, and wherein said orifice defines a uniform radial clearance about the axis.

8. A manifold as set forth in claim 6 wherein said orifice has an upstream edge extending toward said outlet in the direction circumferentially away from said second passageway opposite end.

9. A manifold as set forth in claim 6 wherein said housing includes a groove adjacent said second passageway opposite end and being symmetrical about a plane centered on said axis, said groove being increasingly radially spaced from said axis in a circumferential direction away from said second passageway opposite end.

10. A co-injection manifold comprising a nozzle housing having forward and rearward ends, said nozzle housing including an outlet which is located adjacent said forward end, first and second spaced apart inlets which are located adjacent said rearward end and which are respectively adapted to communicate with first and second injection nozzles, a generally cylindrical inner surface defining a bore centered on an axis extending in a direction from said forward end to said rearward end, said bore having a rearward upstream end and having a forward downstream end communicating with said outlet, a first passageway communicating between said first inlet and said upstream end of said bore, said first passageway including a portion intersecting said bore at an angle of less than ninety degrees relative to said axis, and a second passageway communicating between said second inlet and said bore via a second passageway opening intermediate said upstream and downstream ends thereof, said second passageway including a portion intersecting said bore at an angle of less than ninety degrees relative to said axis, a nozzle member housed in said bore, said nozzle member having a forward end which is spaced rearwardly from said nozzle housing outlet and which has therein an outlet port, said nozzle member having therein a central bore extending along said axis and communicating between said first passageway and said nozzle member outlet port, and said nozzle member having an outer surface portion spaced from said inner surface of said nozzle housing so as to define an annular passageway surrounding said central bore and communicating between said second passageway and said outlet, said nozzle member outer surface including a land having an outer surface forming a portion of a cylinder, said land being located between said second passageway opening and said outlet, being centered on said axis and being symmetrical about a plane including said axis, and said land having an axial length that decreases in a direction circumferentially away from said point at which said second passageway communicates with said bore, and a valve pin extending through said central bore and being movable between a forward position wherein said valve pin extends into and closes both said nozzle member outlet port and said nozzle housing outlet, an intermediate position wherein said valve pin is spaced from said nozzle housing outlet and extends into and closes said nozzle member outlet port, and a rearward position wherein said valve pin is spaced from both said nozzle housing outlet and said nozzle member outlet port.

11. A manifold as set forth in claim 10 wherein said nozzle member outer surface has therein, rearwardly of said land, a groove which is symmetrical about said plane, which has an axial length that decreases in a direction circumferentially away from said point at which said second passageway communicates with said bore, and which has a depth that decreases in a direction circumferentially away from said point at which said second passageway communicates with said bore.

* * * * *

UNITED STATES PATENT AND TRADEMARK OFFICE
CERTIFICATE OF CORRECTION

PATENT NO : 5,950,178
DATED : Sep. 7, 1999
INVENTOR(S): Sergio Borgato

It is certified that error appears in the above-identified patent and that said Letters Patent is hereby corrected as shown below:

On the title page, column 1 after "Filed:" delete "Jul. 29, 1997" and insert therefor -- Jul. 28, 1997 --.

Signed and Sealed this

Twenty-third Day of January, 2001

Attest:

Q. TODD DICKINSON

*Attesting Officer*  *Commissioner of Patents and Trademarks*